US011931844B2

(12) United States Patent
Nakabayashi

(10) Patent No.: US 11,931,844 B2
(45) Date of Patent: Mar. 19, 2024

(54) CUTTING MACHINE

(71) Applicant: DGSHAPE Corporation, Hamamatsu (JP)

(72) Inventor: Masaki Nakabayashi, Hamamatsu (JP)

(73) Assignee: DGSHAPE CORPORATION, Shizuoka (JP)

( * ) Notice: Subject to any disclaimer, the term of this patent is extended or adjusted under 35 U.S.C. 154(b) by 178 days.

(21) Appl. No.: 17/126,286

(22) Filed: Dec. 18, 2020

(65) Prior Publication Data

US 2021/0252614 A1 Aug. 19, 2021

(30) Foreign Application Priority Data

Feb. 17, 2020 (JP) .................. 2020-024197

(51) Int. Cl.
*B23C 1/14* (2006.01)
*B23Q 3/06* (2006.01)
(Continued)

(52) U.S. Cl.
CPC ............... *B23Q 3/061* (2013.01); *B23C 1/14* (2013.01); *B23Q 3/15526* (2013.01);
(Continued)

(58) Field of Classification Search
CPC ............ B23C 2226/18; B23C 2240/24; B23C 2270/08; B23B 2226/18; B23B 2240/36;
(Continued)

(56) References Cited

U.S. PATENT DOCUMENTS 5,468,102 A * 11/1995 Stojanovski ............ B23B 31/06
408/239 R
11,633,266 B2 * 4/2023 Mochizuki ............. B23Q 3/062
433/51
(Continued)

FOREIGN PATENT DOCUMENTS

DE 102009011676 A1 * 7/2010
DE 102012102059 A1 * 9/2013
(Continued)

OTHER PUBLICATIONS

Machine Translation of KR 10-1334524-B1, which KR '524 was published Nov. 2013.*
(Continued)

*Primary Examiner* — Erica E Cadugan
(74) *Attorney, Agent, or Firm* — Keating & Bennett, LLP

(57) ABSTRACT

A cutting machine includes a holder located below a spindle to hold processing targets, and an adaptor connected to a rotation shaft to rotatably support the holder. The holder includes a first holder fixed to the adaptor and including a pin insertion hole to which a fixing pin attached to a processing target is fixed, and a second holder detachably attached to the first holder and including a pin insertion hole at a position facing the pin insertion hole. The fixing pin extends in a Y-axis direction. In the Y-axis direction, a distance between a processing target fixed to the pin insertion hole and a processing target fixed to the pin insertion hole is shorter than a length of the fixing pin.

6 Claims, 11 Drawing Sheets

(51) Int. Cl.
*B23Q 3/155* (2006.01)
*B23Q 3/157* (2006.01)
*A61C 13/00* (2006.01)

(52) U.S. Cl.
CPC ...... *B23Q 3/15706* (2013.01); *B23C 2226/18* (2013.01); *B23C 2240/24* (2013.01); *B23Q 3/15536* (2016.11); *Y10T 409/30896* (2015.01); *Y10T 483/1793* (2015.01); *Y10T 483/1873* (2015.01)

(58) Field of Classification Search
CPC .......... B23Q 3/062; B23Q 3/061; B23Q 3/06; B23Q 3/186; B23Q 3/18; B23Q 2703/10; B23Q 2703/08; B23Q 2703/12; B23Q 2703/02; Y10T 409/30868; Y10T 409/309016; A61C 13/0004; A61C 13/0009; A61C 13/0006; A61C 13/08; A61C 13/083; A61C 13/0022
USPC ........................................................ 269/16
See application file for complete search history.

(56) References Cited

U.S. PATENT DOCUMENTS

| | | | |
|---|---|---|---|
| 2009/0130634 A1* | 5/2009 | Ganley | A61C 13/0022 433/206 |
| 2009/0274994 A1 | 11/2009 | Jung et al. | |
| 2013/0244846 A1 | 9/2013 | Koch | |
| 2021/0260707 A1* | 8/2021 | Geier | B23Q 1/03 |

FOREIGN PATENT DOCUMENTS

| | | |
|---|---|---|
| EP | 3 273 903 B1 | 11/2019 |
| JP | 2010-131395 A | 6/2010 |
| JP | 2017-164201 A | 9/2017 |
| JP | 2018-042894 A | 3/2018 |
| KR | 10-1334524 B1 * | 11/2013 |
| KR | 10-1804514 B1 * | 12/2017 |
| KR | 10-1858624 B1 * | 5/2018 |
| WO | 2013/135687 A1 | 9/2013 |
| WO | WO-2016/085077 A1 * | 6/2016 |
| WO | WO-2020/045774 B1 * | 12/2018 |
| WO | WO-2020/116711 A1 * | 6/2020 |

OTHER PUBLICATIONS

Machine Translation of DE 102009011676-A1, which DE '676 was published Jul. 2010.*
Dictionary definition of the term "facing" from https://www.merriam-webster.com/dictionary/facing, captured Oct. 24, 2023.*
Official Communication issued in corresponding European Patent Application No. 20214551.2, dated Jun. 8, 2021.

* cited by examiner

CUTTING MACHINE

CROSS REFERENCE TO RELATED APPLICATIONS

This application claims the benefit of priority to Japanese Patent Application No. 2020-024197 filed on Feb. 17, 2020. The entire contents of this application are hereby incorporated herein by reference.

BACKGROUND OF THE INVENTION

1. Field of the Invention

The present invention relates to a cutting machine.

2. Description of the Related Art

There has been known a cutting machine that cuts a processing target of a ceramic material or a resin material into a desire shape. The cutting machine includes, for example, a case body having a processing space therein, a retention member that is disposed in the processing space and retains a processing target, and a holding part that is disposed in the processing space and holds a processing tool for performing processing such as cutting and/or polishing on the processing target.

JP2017-164201A discloses a cutting machine including a retention member for retaining a processing target having a rectangular parallelepiped shape. The retention member is connected to a pin disposed on a surface of the processing target, and the processing target is rotatably retained by the retention member.

In the cutting machine described in JP2017-164201A, the retention member can retain only one processing target, and thus, a cutting machine capable of retaining a larger number of processing targets has been desired. US2009/0274994A, for example, discloses a cutting machine including a retention member capable of retaining a plurality of processing targets.

In the retention member of US2009/0274994A, however, when the processing target is to be fixed to the retention member, a pin disposed on the processing target needs to be inserted in a fixing hole. Thus, it is necessary to provide an extra space that allows the pin to be removed or inserted without interference between the processing target and another member. This causes the problem of an increase in size of the retention member, which increases the size of the entire cutting machine.

SUMMARY OF THE INVENTION

Preferred embodiments of the present invention provide cutting machines including retention structures that are able to retain a larger number of processing targets while reducing or preventing an increase in size of the retention structures.

A cutting machine according to a preferred embodiment of the present invention includes a spindle extending in a first direction to hold a processing tool to cut one or more processing targets, a holder located below the spindle to hold the one or more processing targets, a rotation shaft extending in a second direction intersecting the first direction, and a rotation support connected to the rotation shaft, the rotation support rotatably supporting the holder. The holder includes a first holder including at least one first fixing portion and fixed to the rotation support, a fixing pin attached to the processing targets being fixed to the at least one first fixing portion, and a second holder including at least one second fixing portion and being detachably attached to the first holder, the at least one second fixing portion being located at a position facing the at least one first fixing portion and the fixing pin being fixed to the at least one second fixing portion. The fixing pin is fixed to the at least one first fixing portion and the at least one second fixing portion to extend in the second direction. With respect to the second direction, a distance between the processing targets fixed to the at least one first fixing portion and the processing targets fixed to the at least one second fixing portion is shorter than a length of the fixing pin.

In the cutting machine described above, the second holder is detachably attached to the first holder. Thus, fixing of a processing target to the at least one first fixing portion of the first holder and fixing a processing target to the at least one second fixing portion of the second holder are able to be performed independently of each other. That is, in fixing the processing target to the at least one first fixing portion, it is unnecessary to consider interference with the processing target fixed to the at least one second fixing portion. Similarly, in fixing the processing target to the at least one second fixing portion, it is also unnecessary to consider interference with the processing target fixed to the at least one first fixing portion. Thereafter, it is sufficient to attach the second holder to which the processing target is fixed to the first holder to which the processing target is fixed. Thus, the distance between the processing target fixed to the at least one first fixing portion and the processing target fixed to the at least one second fixing portion with respect to the second direction is able to be shorter than the length of the fixing pin. That is, since an extra space to attach processing targets is unnecessary, an increase in size of the entire holder is able to be reduced or prevented.

The preferred embodiments of the present invention provide cutting machines including retention structures that are able to retain a larger number of processing targets while reducing or preventing an increase in size of the retention structures.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
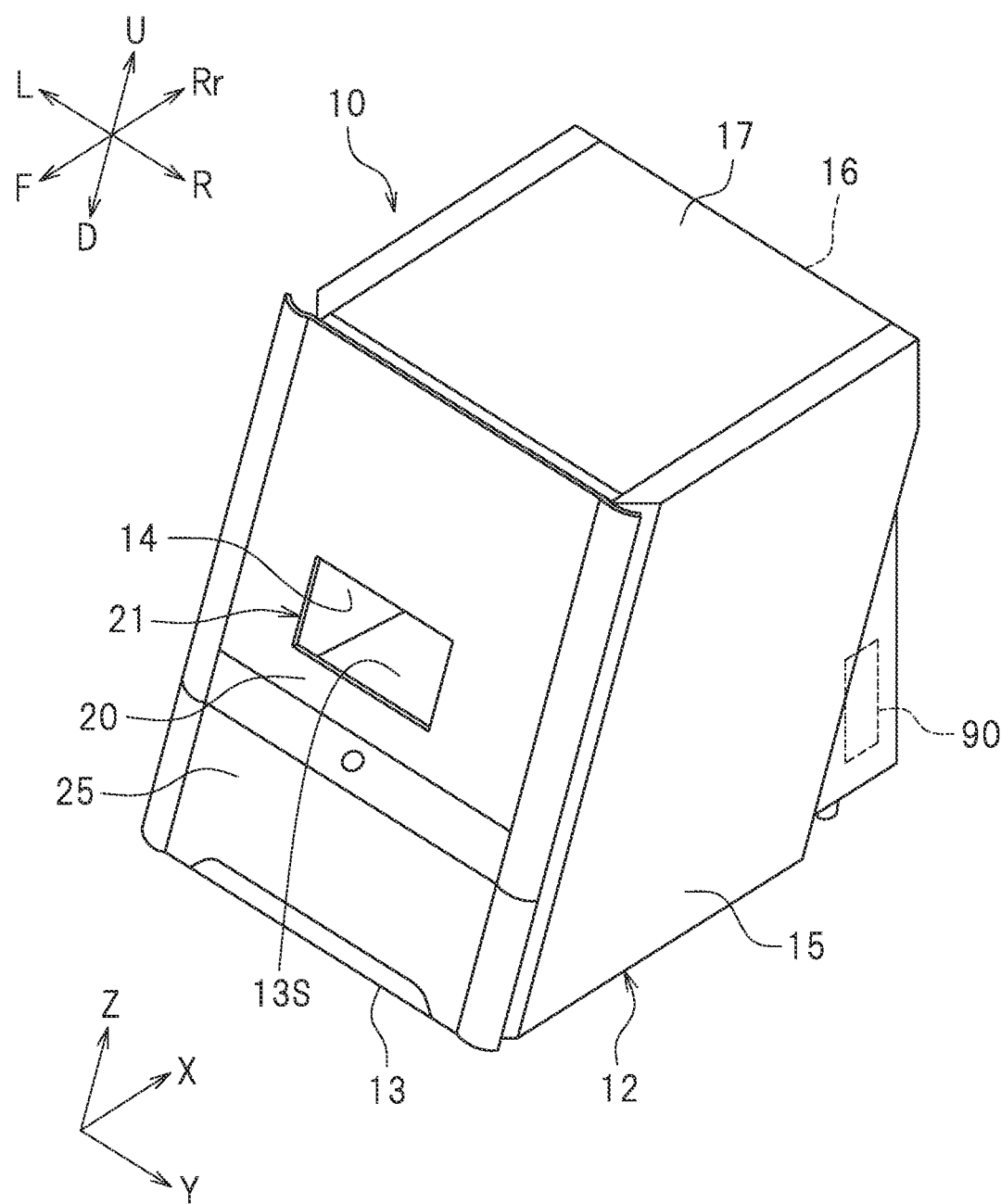
FIG. 1 is a perspective view of a cutting machine according to a preferred embodiment of the present invention.

Cutting machines according to preferred embodiments of the present invention will be described hereinafter with reference to the drawings. The preferred embodiments described here are, of course, not intended to limit the present invention. Elements and features having the same functions are denoted by the same reference numerals, and description for the same features and portions will not be repeated or will be simplified as appropriate.

Figure 2:
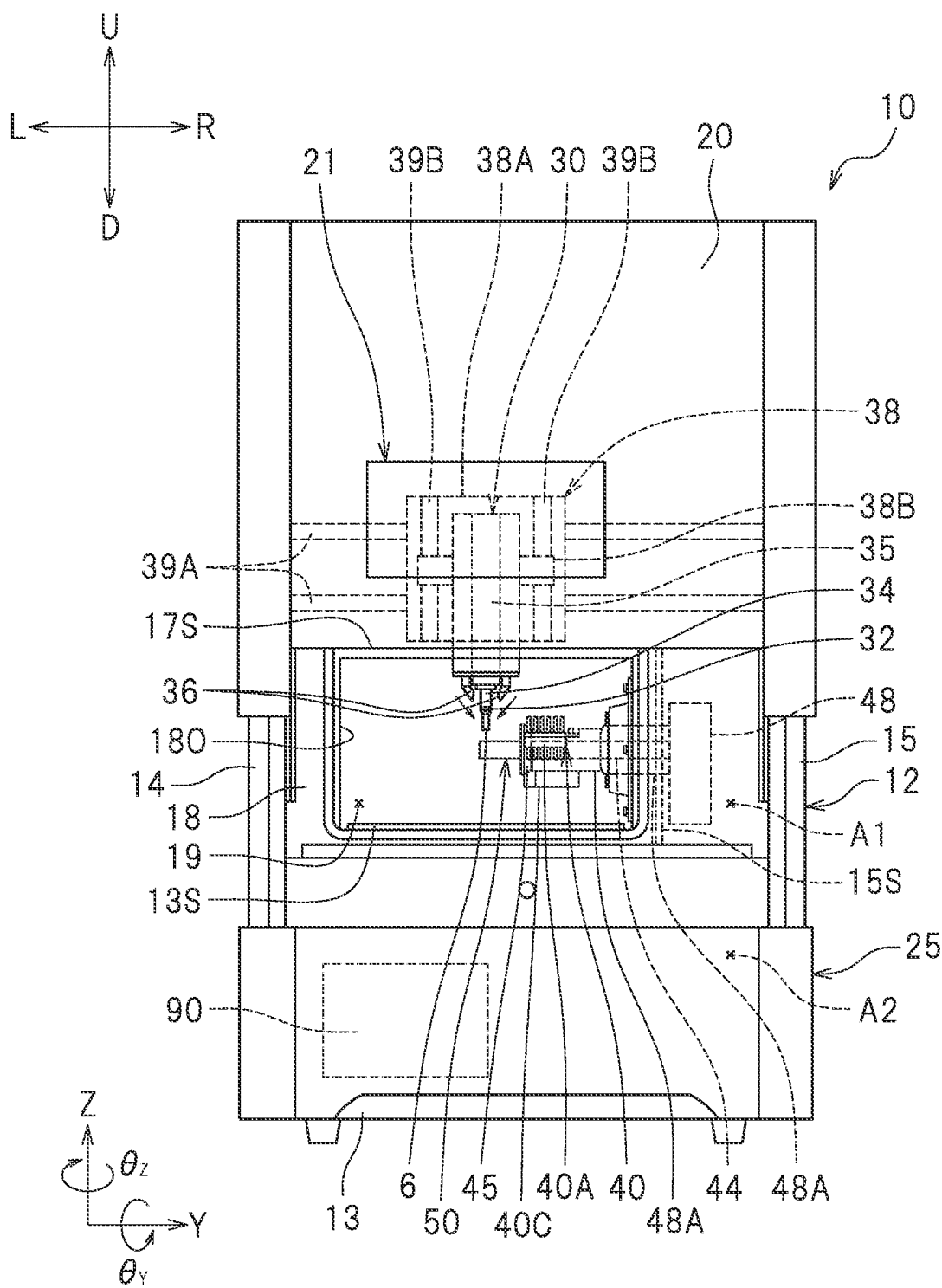
FIG. 2 is a front view of a state where a front upper cover of the cutting machine of FIG. 1 is open.
Figure 3:
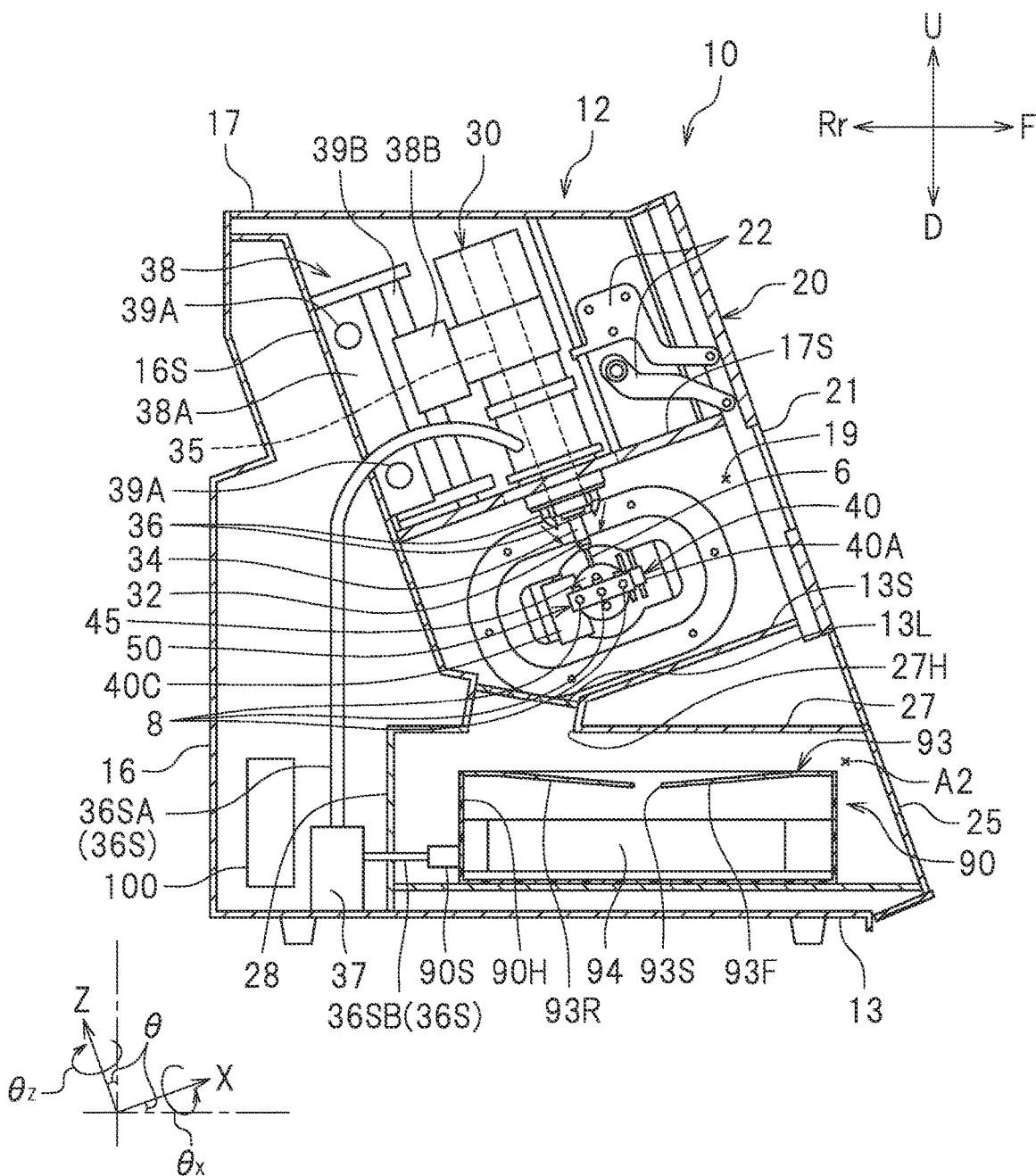
FIG. 3 is a cross-sectional view of a state where the front upper cover of the cutting machine of FIG. 1 is closed.

FIG. 1 is a perspective view of a cutting machine 10. FIG. 2 is a front view of a state where a front upper cover 20 of the cutting machine 10 is open. FIG. 3 is a cross-sectional view of a state where the front upper cover 20 of the cutting machine 10 is closed. In the following description, when the cutting machine 10 is seen from the front, a direction away from the cutting machine 10 will be referred to as forward, and a direction toward the cutting machine 10 will be referred to as rearward. Left, right, up, and down respectively refer to left, right, up, and down when the cutting machine 10 is seen from the front. Characters F, Rr, L, R, U, and D in the drawings represent front, rear, left, right, up, and down, respectively.

The cutting machine 10 is oriented in an XYZ orthogonal coordinate system. In this preferred embodiment, the X axis extends in the front-rear direction. As illustrated in FIG. 3, in this preferred embodiment, the X axis tilts by θ from the horizontal axis. The X axis may extend along the horizontal axis. The Y axis extends in the left-right directions. The Z axis extends in the top-bottom directions. As illustrated in FIG. 3, in this preferred embodiment, the Z axis tilts by θ from the vertical axis. The Z axis may extend along the vertical axis. Characters θX, θY, and θZ represent rotation directions about the X axis, the Y axis, and Z axis, respectively. These directions are defined simply for convenience of description, and are not intended to limit the state of installation of the cutting machine 10 and do not limit the present invention.

Figure 4:
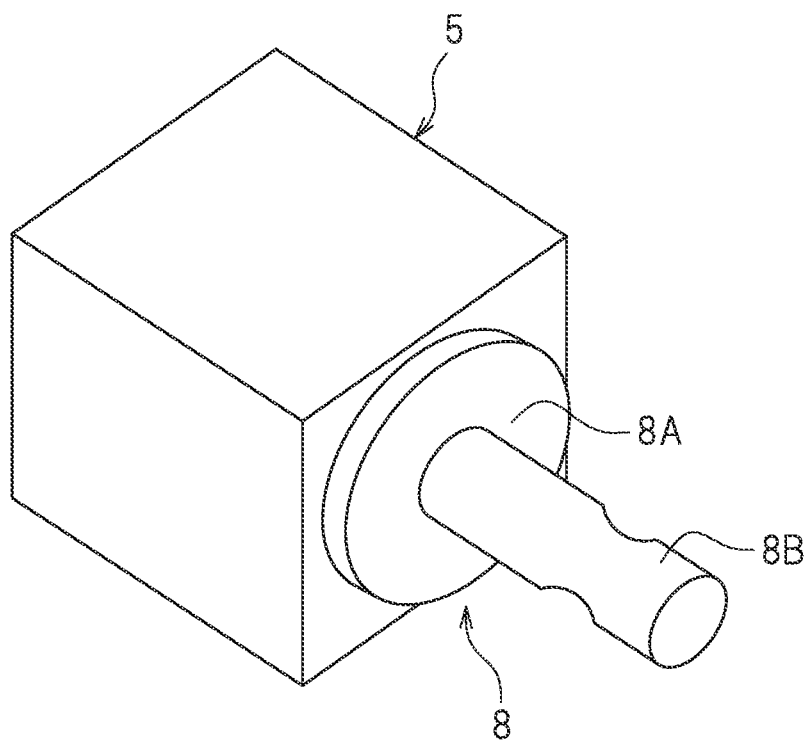
FIG. 4 is a perspective view of a processing target attached to a fixing pin according to a preferred embodiment of the present invention.

The cutting machine 10 is used to cut and polish a processing target 5 (see FIG. 4). The cutting machine 10 may produce dental moldings, for example, crown prosthetics such as crowns, inlays, onlays, and veneers, support bases (abutments for implants) to support artificial teeth, denture bases, and artificial teeth, by processing the processing target 5. The processing target 5 herein has a substantially block shape (e.g., cube or rectangular parallelepiped shape). The processing target 5 may have another shape, for example, a disc shape. The processing target 5 is formed of a resin (resin material) such as a polymethylmethacrylate (PMMA) resin, a polyether ether ketone (PEEK) resin, or a hybrid resin, a ceramics material such as glass ceramics or zirconia, a metal material such as titanium or a titanium alloy, wax, or gypsum, for example. In the case of using zirconia, semi-sintered zirconia is used, for example. The processing target 5 is not specifically limited to a specific shape and a specific material.

As illustrated in FIG. 4, in this preferred embodiment, a fixing pin 8 is attached to the processing target 5. The processing target 5 is housed in the cutting machine 10 while being held by the fixing pin 8. The processing target 5 is cut while being held by the fixing pin 8. The fixing pin 8 includes a plate 8A and a rod 8B. The plate 8A is attached to the processing target 5. The rod 8B projects from the plate 8A. The rod 8B is inserted in a pin insertion hole 61H and a pin insertion hole 71H (see FIG. 8) of holder 50 described later (see FIG. 5).

The cutting machine 10 is able to use a coolant in a cutting process, that is, is a wet-type cutting machine. The "coolant" may be water-soluble or water-insoluble. The "coolant" may be water itself, or a mixture in which an additive to increase a cooling effect, for example, is added to water. For example, the coolant may include a water-insoluble component such as mineral oil or oils and a surfactant, while including water as a main component (i.e., a component with a largest portion in mass %).

As illustrated in FIGS. 1 through 3, the cutting machine 10 has a box shape. The cutting machine 10 includes a case body 12, the front upper cover 20, and a front lower cover 25. The case body 12 is a casing of the cutting machine 10. The case body 12 is hollow. The case body 12 includes a bottom wall 13, a left wall 14, a right wall 15, a rear wall 16, an upper wall 17, a front wall 18 (see FIG. 2), a first partition bottom wall 13S (see FIG. 2), a partition right wall 15S (see FIG. 2), a first partition rear wall 16S (see FIG. 3), a partition upper wall 17S (see FIG. 3), a second partition bottom wall 27 (see FIG. 3), and a second partition rear wall 28 (see FIG. 3). The left wall 14 extends upward from the left end of the bottom wall 13. The right wall 15 extends upward from the right end of the bottom wall 13. The rear wall 16 extends upward from the rear end of the bottom wall 13. The left end of the rear wall 16 is connected to the rear end of the left wall 14, and the right end of the rear wall 16 is connected to the rear end of the right wall 15. The front wall 18 extends upward from the front end of the first partition bottom wall 13S. The left end of the front wall 18 is connected to the front end of the left wall 14, and the right end of the front wall 18 is connected to the front end of the right wall 15. The upper end of the front wall 18 is connected to the front end of the upper wall 17. The upper wall 17 is connected to the upper ends of the left wall 14, the right wall 15, the rear wall 16, and the front wall 18.

As illustrated in FIG. 3, the first partition bottom wall 13S is located above the bottom wall 13. The first partition bottom wall 13S tilts gradually downward from the front toward the rear. A lid 13L is located behind the first partition bottom wall 13S. The lid 13L has a mesh pattern, and the coolant is able to pass through the lid 13L in the top-bottom direction. The partition right wall 15S is located at the right of the left wall 14 and at the left of the right wall 15. The partition right wall 15S extends upward from the first partition bottom wall 13S. The first partition rear wall 16S is located ahead of the rear wall 16 and behind the front wall 18. The first partition rear wall 16S is connected to the first partition bottom wall 13S, the left wall 14, the partition right wall 15S, and the partition upper wall 17S. The partition upper wall 17S is located above the first partition bottom wall 13S and below the upper wall 17.

As illustrated in FIG. 3, the second partition bottom wall 27 is located below the first partition bottom wall 13S and above the bottom wall 13. The second partition bottom wall 27 extends in parallel or substantially in parallel with the bottom wall 13. The second partition bottom wall 27 includes a discharge port 27H penetrating the second partition bottom wall 27 in the top-bottom direction. The discharge port 27H is always open. The discharge port 27H is not provided with a valve body or the like able to switch between open and close, for example. The second partition rear wall 28 is located ahead of the rear wall 16 and behind the front wall 18. The second partition rear wall 28 is located below the first partition rear wall 16S. The second partition rear wall 28 extends in parallel or substantially in parallel with the rear wall 16. The second partition rear wall 28 extends upward from the bottom wall 13. The upper end of the second partition rear wall 28 is connected to the second partition bottom wall 27.

As illustrated in FIG. 2, the case body 12 includes an opening 18O at a side surface (front wall 18 in this preferred embodiment). The opening 18O is defined by the left wall 14, the first partition bottom wall 13S, the partition right wall 15S, and the partition upper wall 17S. The inside of the case body 12 is divided into a left portion and a right portion by the partition right wall 15S. At the left of the case body 12, a processing space 19 is provided while being surrounded by the left wall 14, the first partition bottom wall 13S, the partition right wall 15S, the partition upper wall 17S, the first partition rear wall 16S, and the front upper cover 20. In the processing space 19, a cutting process is performed on the processing target 5. At the right of the case body 12, a first accommodating space A1 is surrounded by the partition right wall 15S, the first partition bottom wall 13S, the right wall 15, the partition upper wall 17S, the first partition rear wall 16S, and the front wall 18. Below the processing space 19, a second accommodating space A2 is surrounded by the left wall 14, the bottom wall 13, the right wall 15, the second partition bottom wall 27, the second partition rear wall 28, and the front lower cover 25. The second accommodating space A2 always communicates with the processing space 19 through the discharge port 27H in the second partition bottom wall 27.

As illustrated in FIG. 3, the front upper cover 20 is supported by a support arm 22, an end of the support arm 22 is attached to the case body 12. The front upper cover 20 moves in the top-bottom direction about a shaft (not shown) of the support arm 22 to thereby freely cover and uncover the opening 18O (see FIG. 2). Accordingly, the opening 18O of the case body 12 is switched between an open state and a closed state. In housing and removing the processing target 5 in or from the cutting machine 10 or performing maintenance of the cutting machine 10, for example, a user moves the front upper cover 20 upward to open the opening 18O. Accordingly, the processing space 19 communicates with the outside. On the other hand, in performing a cutting process, the user moves the front upper cover 20 downward to close the opening 18O. Accordingly, the processing space 19 is isolated from the outside.

As illustrated in FIG. 2, the front upper cover 20 includes a window 21. The window 21 is smaller than the opening 18O of the case body 12 in a front view. The window 21 is made of, for example, a transparent acrylic plate or a glass panel. The user is allowed to see the processing space 19 through the window 21 while the front upper cover 20 is closed, for example, in a cutting process.

The front lower cover 25 is slidable in the front-rear directions along supports (not shown) attached to the left wall 14 and the right wall 15. When the front lower cover 25 moves in the front-rear directions to switch the second accommodating space A2 between an open state and a closed state. In attaching or detaching a storage tank 90 (see FIG. 2) storing a coolant, the user moves the front lower cover 25 forward. On the other hand, in performing a cutting process, the user slides the front lower cover 25 rearward. Accordingly, the second accommodating space A2 is closed. The closing of the second accommodating space A2 in the cutting process is able to reduce or prevent erroneous detachment of the storage tank 90 by the user in the middle of the cutting process.

As illustrated in FIG. 2, the cutting machine 10 includes a spindle 30, liquid discharge nozzles 36, a carriage 38, a tool magazine 40, an adaptor 45, a holder 50, a moving mechanism 48, the storage tank 90, and a controller 100 (see FIG. 3). The adaptor 45 is an example of a rotation support. The carriage 38 is located above the processing space 19. The spindle 30 and the liquid discharge nozzles 36 are mounted on the carriage 38. The spindle 30 penetrates the partition upper wall 17S. The tool magazine 40, the adaptor 45, and the holder 50 are provided in the processing space 19. The moving mechanism 48 is provided in the first accommodating space A1. The storage tank 90 is detachably provided in the second accommodating space A2.

As illustrated in FIG. 2, the carriage 38 is movable in the Z-axis direction and the Y-axis direction. The carriage 38 includes a first carriage 38A and a second carriage 38B. The first carriage 38A is supported by a pair of first guide shafts 39A extending in the Y-axis direction. The first carriage 38A is movable in the Y-axis direction along the first guide shaft 39A by a first driving mechanism (not shown). The left end of the first guide shaft 39A is connected to the left wall 14. The right end of the first guide shaft 39A is connected to the right wall 15 through the partition right wall 15S. The second carriage 38B is supported by a pair of second guide shafts 39B extending in the Z-axis direction. The second carriage 38B is movable in the Z-axis direction along the second guide shaft 39B by a second driving mechanism (not shown). The second guide shaft 39B is provided in the first carriage 38A. Thus, when the first carriage 38A moves in the Y-axis direction, the second carriage 38B also moves in the Y-axis direction similarly. The first driving mechanism and the second driving mechanism are electrically connected to the controller 100 and controlled by the controller 100.

As illustrated in FIG. 2, the spindle 30 is provided on the second carriage 38B. The spindle 30 moves in the XYZ orthogonal coordinate system in accordance with movement of the carriage 38. More specifically, the spindle 30 moves in the Z-axis direction in accordance with movement of the second carriage 38B, and moves in the Y-axis direction in accordance with movement of the first carriage 38A. The spindle 30 extends in the Z-axis direction. The Z-axis direction is an example of a first direction. The spindle 30 supports (holds) a processing tool 6 (also referred to as a milling bar) and the processing tool 6 is rotatable. The spindle 30 rotates the processing tool 6 to cut the processing target 5. The spindle 30 includes a holding portion 32 (e.g., collet chuck), a rotating portion 34, and a sealing portion 35. The sealing portion 35 has a cylindrical shape. The sealing portion 35 extends in the top-bottom directions. The rotating portion 34 is provided at the lower end of the sealing portion 35. The rotating portion 34 rotates relative to the sealing portion 35.

As illustrated in FIG. 2, the holding portion 32 is located at the lower end of the rotating portion 34. The holding portion 32 rotates together with the rotating portion 34. The holding portion 32 supports (holds) the upper end of the processing tool 6. The rotating portion 34 rotates the processing tool 6 supported by the holding portion 32. The rotating portion 34 is connected to a first motor (not shown). The first motor is electrically connected to the controller 100 and controlled by the controller 100. When the first motor is driven, the rotating portion 34 rotates about the Z axis OZ. With the rotation of the rotating portion 34, the processing tool 6 held by the holding portion 32 rotates about the Z axis OZ.

As illustrated in FIG. 2, the liquid discharge nozzles 36 are provided in the spindle 30. The liquid discharge nozzles 36 are provided at the sides of the rotating portion 34 of the spindle 30. Similar to the spindle 30, the liquid discharge nozzles 36 move in the XYZ orthogonal coordinate system in accordance with movement of the carriage 38. In this preferred embodiment, the four liquid discharge nozzles 36 in total are located at the front, rear, left, and right of the rotating portion 34. The positions and number of the liquid discharge nozzles 36 are not specifically limited. Discharge ports of the liquid discharge nozzles 36 are located above the holder 50 and the processing tool 6. As shown by arrows in, for example, FIG. 2, the liquid discharge nozzles 36 discharge a coolant into the processing space 19 while the processing target 5 is processed with the processing tool 6. The liquid discharge nozzles 36 typically discharge the coolant toward the processing tool 6 and/or the processing target 5. As illustrated in FIG. 3, the liquid discharge nozzles 36 are connected to a supply port 90S of the storage tank 90 through a liquid supply passage 36S. The liquid supply passage 36S is not limited to a specific structure, and is formed of a deformable resin tube, for example. A liquid feed pump 37 is provided in the liquid supply passage 36S. The liquid feed pump 37 supplies the coolant in the storage tank 90 to the liquid discharge nozzles 36. The liquid feed pump 37 is controlled by the controller 100. The liquid supply passage 36S includes a first supply passage 36SA connecting the liquid discharge nozzles 36 to the liquid feed pump 37 and a second supply passage 36SB connecting the liquid feed pump 37 to the supply port 90S. The first supply passage 36SA penetrates the first partition rear wall 16S and is connected to the liquid discharge nozzles 36 through the spindle 30. The second supply passage 36SB penetrates the second partition rear wall 28. The second supply passage 36SB is connected to the supply port 90S.

The storage tank 90 collects the coolant discharged from the liquid discharge nozzles 36. In this preferred embodiment, the coolant discharged from the liquid discharge nozzles 36 passes through the discharge port 27H from the processing space 19 and flows into the second accommodating space A2. That is, the storage tank 90 collects the coolant through the discharge port 27H. As illustrated in FIG. 3, the storage tank 90 is detachably provided at a predetermined position of the second accommodating space A2. The storage tank 90 is located below the discharge port 27H. The storage tank 90 includes the supply port 90S, a lid 93, and a filter 94. The supply port 90S is provided in a rear portion of the storage tank 90. The supply port 90S supplies the coolant in the storage tank 90 to the liquid discharge nozzles 36. The lid 93 is placed over opening portion 90H of the storage tank 90. The lid 93 is located at a position that does not interfere with the filter 94. The lid 93 includes a front portion 93F that tilts from the front toward the rear in a cross section, and a rear portion 93R that tilts from the rear toward the front in the cross section. A center portion of the lid 93 in the front-rear direction includes a collection port 93S that is open upward. The coolant discharged from the liquid discharge nozzles 36 flows into the storage tank 90 through the discharge port 27H and the collection port 93S of the lid 93. The filter 94 filters the coolant in the storage tank 90. The filter 94 removes cutting powder and the like from the coolant. The filter 94 has a cylindrical shape, for example. The filter 94 is formed of cellulose fibers.

The moving mechanism 48 moves the tool magazine 40 in the X-axis direction. As illustrated in FIG. 2, the moving mechanism 48 is located at the right of the tool magazine 40. The moving mechanism 48 includes a shaft 48A extending in the Y-axis direction. The shaft 48A penetrates the partition right wall 15S. A portion of the shaft 48A (right portion) is provided in the second accommodating space A2, and another portion (left portion) of the shaft 48A is provided in the processing space 19. The left end portion of the shaft 48A is provided with the adaptor 45 and the tool magazine 40. The moving mechanism 48 is movable in the X-axis direction by a third driving mechanism (not shown). The third driving mechanism is electrically connected to the controller 100 and controlled by the controller 100.

Figure 5:
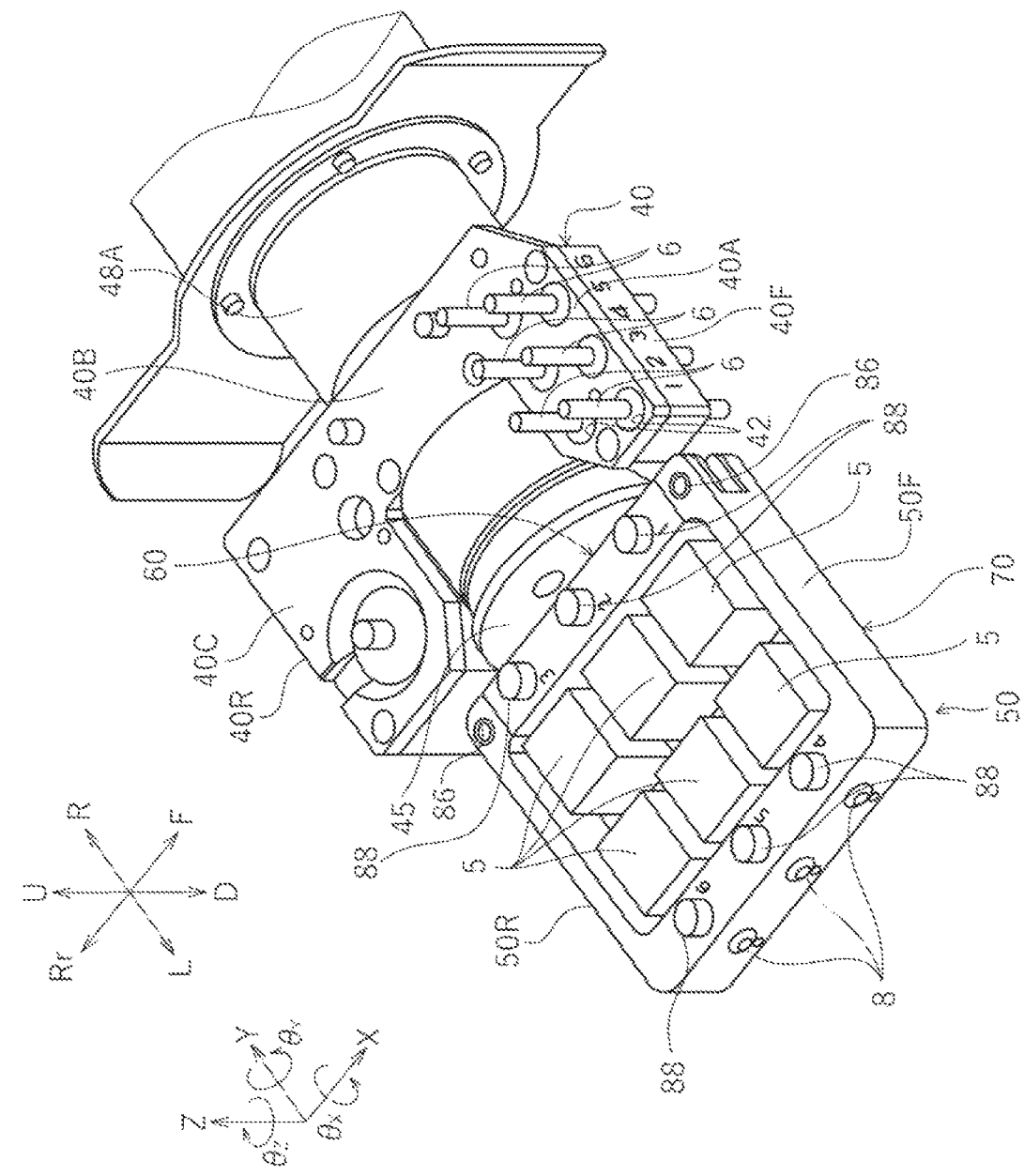
FIG. 5 is a perspective view of a tool magazine, an adaptor, and a holder according to a preferred embodiment of the present invention.
Figure 6:
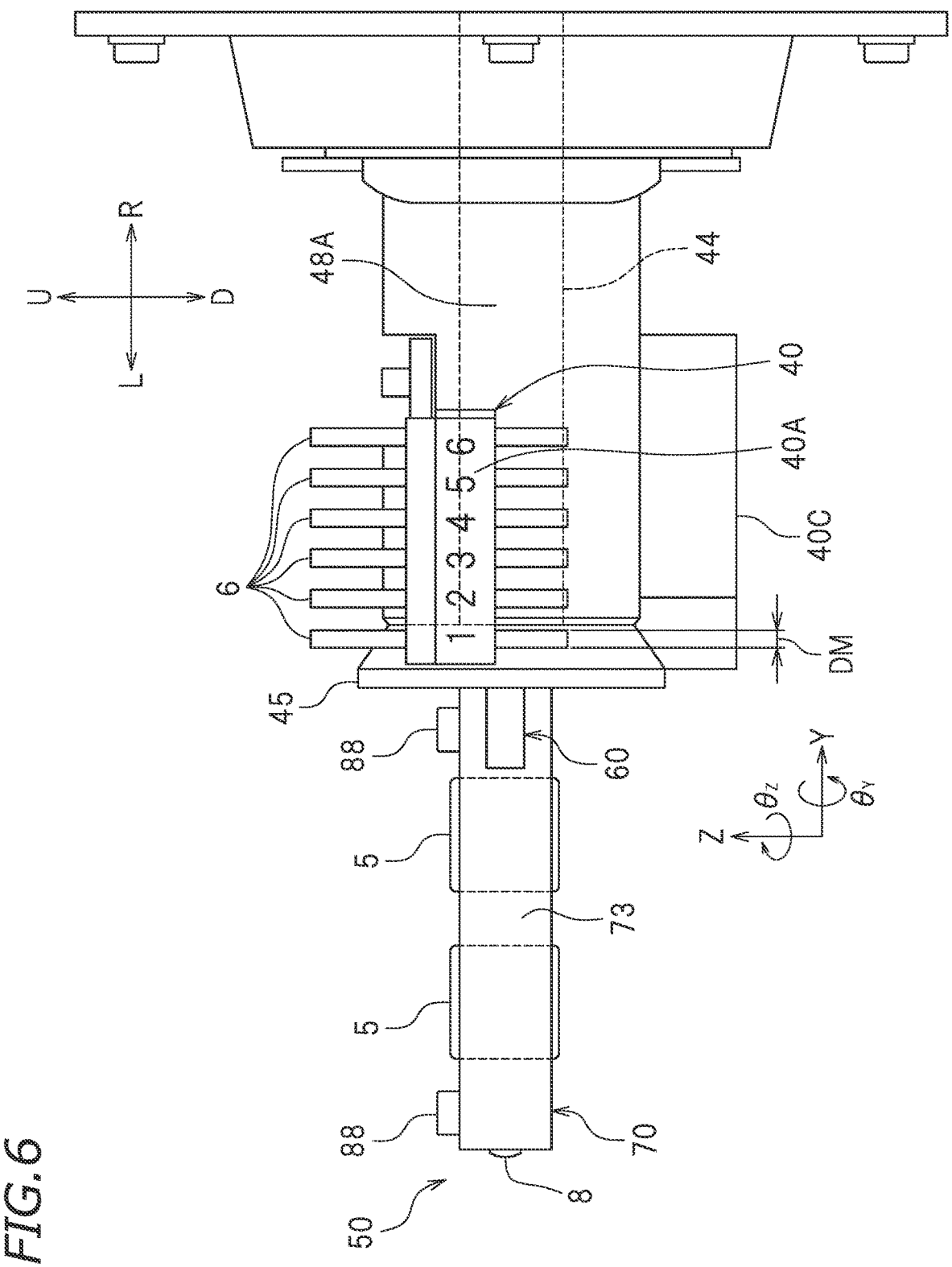
FIG. 6 is a front view of a tool magazine, a adaptor, and a holder according to a preferred embodiment of the present invention.

FIG. 5 is a perspective view of the tool magazine 40, the adaptor 45, and the holder 50. FIG. 6 is a front view of the tool magazine 40, the adaptor 45, and the holder 50. The tool magazine 40 is able to receive a plurality of processing tools 6. The tool magazine 40 is located between the adaptor 45 and the moving mechanism 48. The tool magazine 40 is non-rotatably provided on the surface of the shaft 48A. When the moving mechanism 48 moves in the X-axis direction, the tool magazine 40 moves in the X-axis direction. The tool magazine 40 includes a first portion 40A to receive the processing tools 6, a second portion 40B located behind the first portion 40A and connected to the shaft 48A, and a third portion 40C located behind the second portion 40B. The first portion 40A of the tool magazine 40 includes a plurality of (for example, six in this preferred embodiment) holes 42 that each receive a processing tool 6. The processing tools 6 are inserted in the holes 42 with upper portions thereof exposed. In exchanging processing tools 6, the processing tool 6 held by the holding portion 32 of the spindle 30 is returned to the hole 42. Thereafter, the spindle 30 is moved to a position above a processing tool 6 to be used next, and the holding portion 32 holds the upper end of the processing tool 6 located below the holding portion 32.

As illustrated in FIG. 6, a rotating shaft 44 rotatably supporting the adaptor 45 is provided inside the shaft 48A. The rotating shaft 44 extends in the Y-axis direction, and connected to the adaptor 45 and the moving mechanism 48. The Y-axis direction is an example of a second direction. The rotating shaft 44 is provided with a second motor (not shown). The second motor is electrically connected to the controller 100 and controlled by the controller 100. The rotating shaft 44 is rotatable about the Y axis θY by the second motor. When the rotating shaft 44 rotates about the Y axis θY, the adaptor 45 and the holder 50 rotate about the Y axis θY. The rotating shaft 44 is rotatable independently of the shaft 48A. That is, even when the rotating shaft 44 rotates about the Y axis θY, the shaft 48A does not rotate about the Y axis θY.

As illustrated in FIG. 5, the adaptor 45 rotatably supports the holder 50. More specifically, the adaptor 45 rotatably supports a first holder 60 described later of the holder 50. The adaptor 45 detachably holds a second holder 70 described later with the first holder 60 located therebetween. The adaptor 45 is movable together with the tool magazine 40. The tool magazine 40 and the adaptor 45 are movable in the X-axis direction by the moving mechanism 48. Even when the adaptor 45 rotates about the Y axis θY, the tool magazine 40 does not rotate about Y axis θY.

Figure 7:
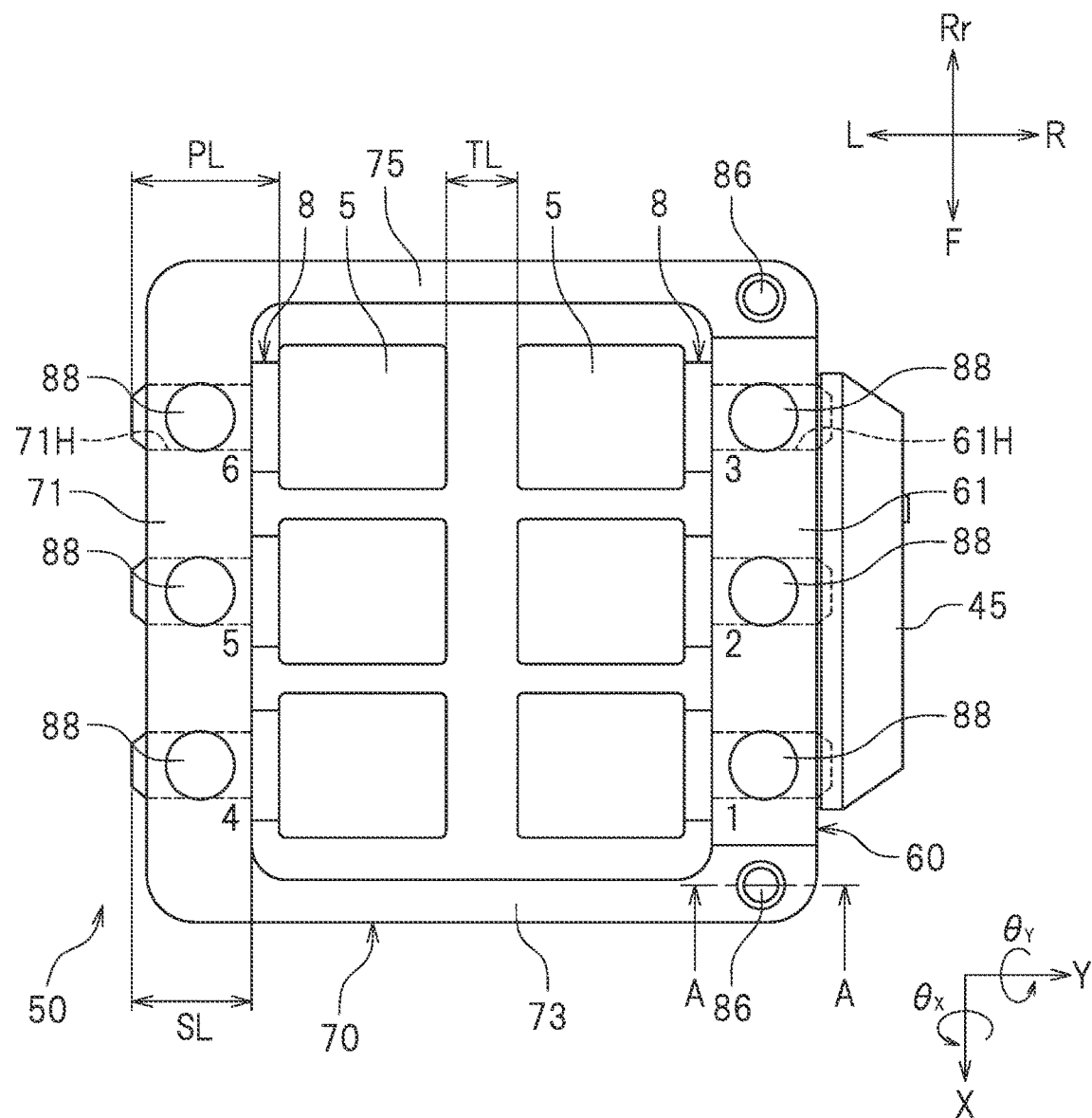
FIG. 7 is a plan view of a holder according to a preferred embodiment of the present invention.
Figure 8:
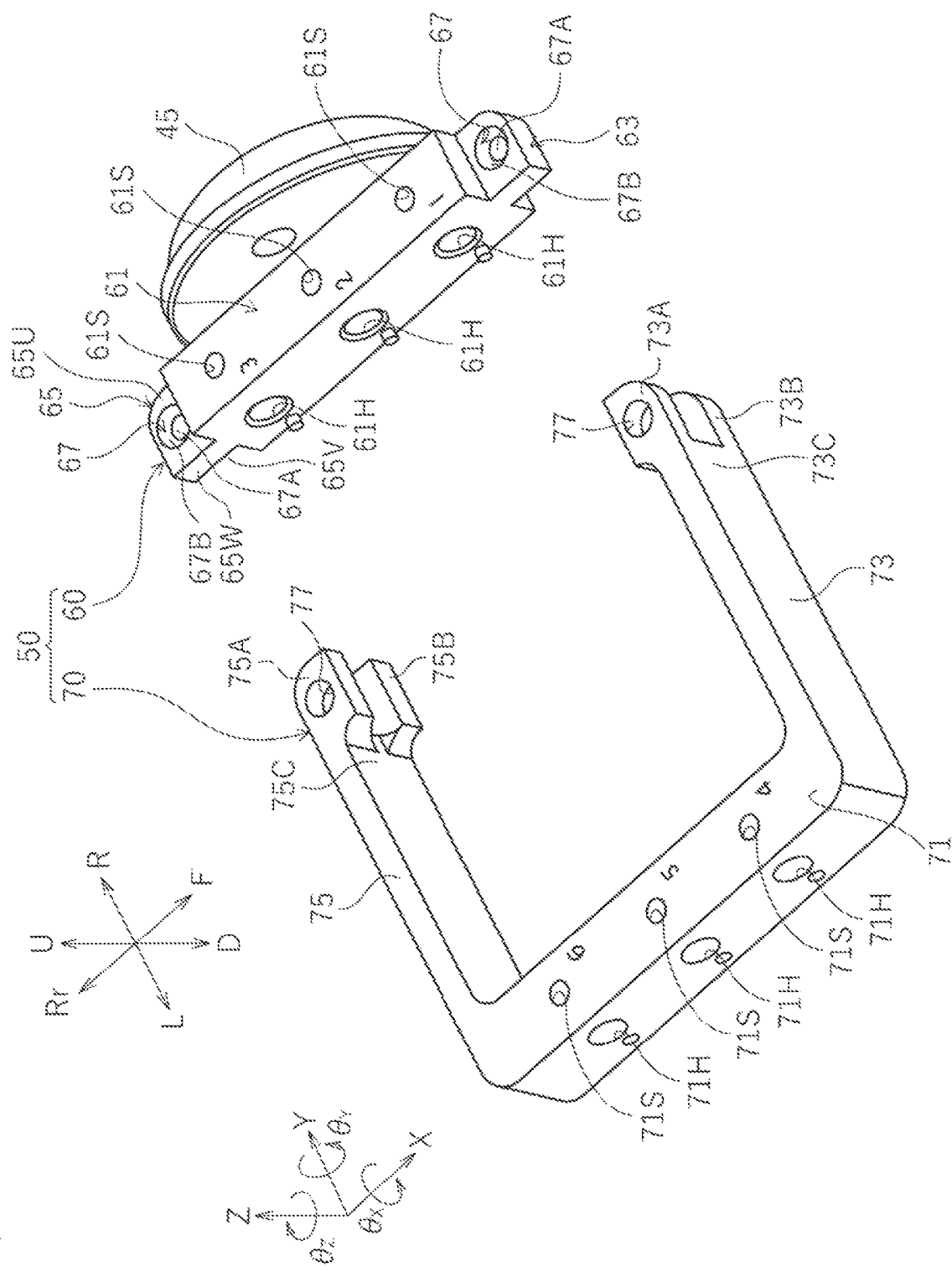
FIG. 8 is a disassembled perspective view of a holder according to a preferred embodiment of the present invention.

The holder 50 detachably holds the processing targets 5. As illustrated in FIG. 7, the holder 50 is able to hold a plurality of processing targets 5. The holder 50 holds the processing targets 5 with the fixing pins 8 (see also FIG. 4). In this preferred embodiment, a cutting process is performed on the processing targets 5 while the holder 50 holds the processing targets 5 with the fixing pins 8. As illustrated in FIG. 2, the holder 50 is located below the spindle 30. As illustrated in FIG. a front end 50F of the holder 50 is located behind the front end 40F of the tool magazine 40. A rear end 50R of the holder 50 is located ahead of the rear end 40R of the tool magazine 40. As illustrated in FIG. 8, the holder 50 includes the first holder 60 and the second holder 70 detachably attached to the first holder 60.

As illustrated in FIG. 8, the first holder 60 is fixed to the adaptor 45. The first holder 60 includes a body 61 extending in the front-rear direction (i.e., X-axis direction), a front coupled portion 63 extending forward from the front end of the body 61, and a rear coupled portion 65 extending rearward from the rear end of the body 61. The front coupled portion 63 and the rear coupled portion 65 are examples of a second coupling portion. In the examples illustrated in FIGS. 8 and 9, the holder 50 does not hold the processing targets 5.

As illustrated in FIG. 8, a side surface of the body 61 includes a plurality of pin insertion holes 61H provided in the front-rear direction (i.e., X-axis direction). In this preferred embodiment, three pin insertion holes 61H are provided in the body 61, but the number of pin insertion holes 61H is not specifically limited. The pin insertion holes 61H are provided at regular intervals. The pin insertion holes 61H extend in the Y-axis direction. The rods 8B of the fixing pins 8 (see FIG. 4) are inserted in the pin insertion holes 61H. That is, the fixing pins 8 are inserted in the pin insertion holes 61H to extend in the Y-axis direction. In this preferred embodiment, portions of the rods 8B inserted in the pin insertion holes 61H penetrate the body 61 to be locked in unillustrated recesses of the adaptor 45 (see FIG. 7). The upper surface of the body 61 includes a plurality of screw insertion holes 61S provided in the front-rear direction. The screw insertion holes 61S respectively communicate with the pin insertion holes 61H. The screw insertion holes 61S are provided at regular intervals. Fixing screws 88 (see FIG. 7) are inserted in the screw insertion holes 61S. The fixing screws 88 are locked with the rods 8B of the fixing pins 8. The screw insertion holes 61S extend in the Z-axis direction. The pin insertion holes 61H are an example of a first fixing portion.

As illustrated in FIG. 8, the front coupled portion 63 and the rear coupled portion 65 have locking recesses 67 with which fastening screws 86 (see FIG. 7) are locked. Each of the locking recesses 67 includes a cylindrical through hole 67A and a slope 67B that tilts outward toward the top. That is, the opening of each locking recess 67 gradually enlarges toward the top. The slope 67B is an example of a second slope.

As illustrated in FIG. 7, the second holder 70 is attached to the first holder 60 with the fastening screws 86. The second holder 70 has a U shape in plan view. The second holder 70 is detachably provided on the first holder 60 with respect to the Y-axis direction. That is, the second holder 70 is attached to the first holder 60 or detached from the first holder 60 by sliding the second holder 70 in the Y-axis direction. The second holder 70 includes a body 71 extending in the front-rear direction (i.e., X-axis direction), a front coupling portion 73 extending rightward from the front end of the body 71, and a rear coupling portion 75 extending rightward from the rear end of the body 71. The front coupling portion 73 and the rear coupling portion 75 are an example of a first coupling portion.

Figure 9:
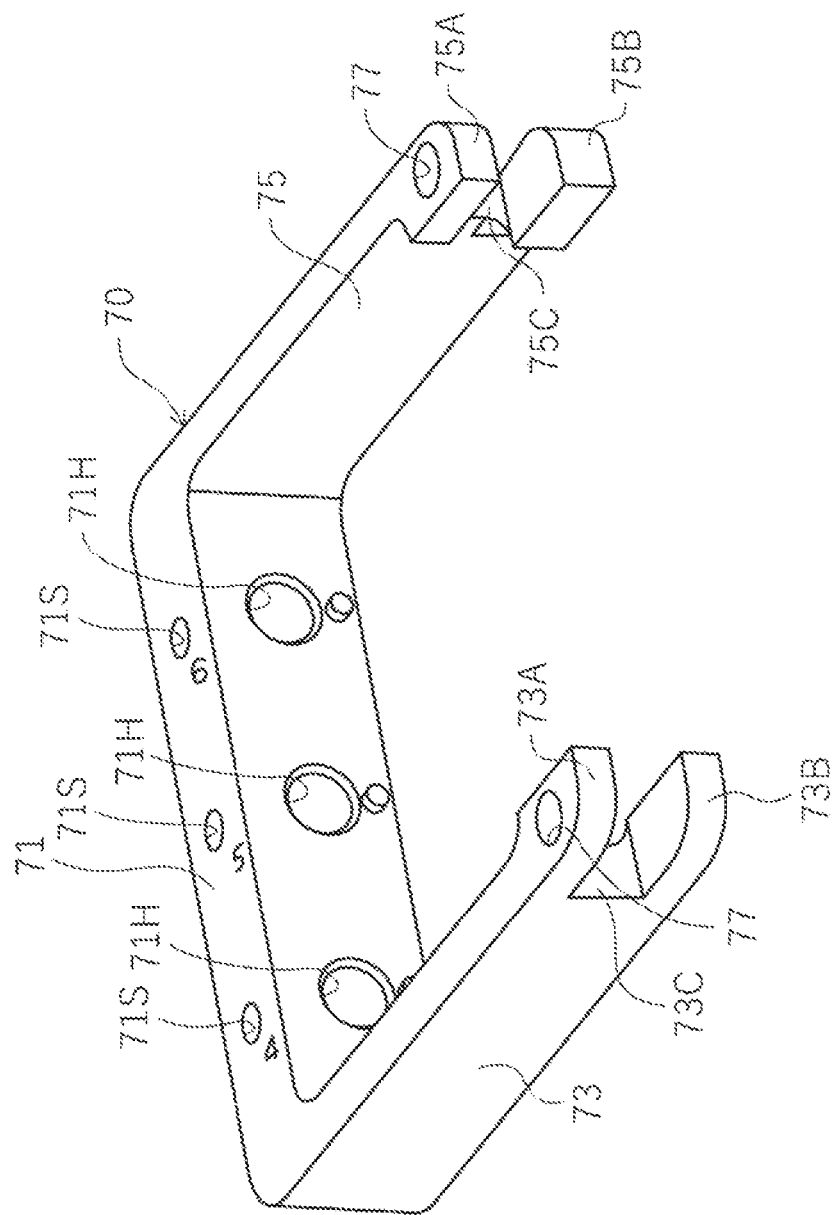
FIG. 9 is a perspective view of a second holder according to a preferred embodiment of the present invention.

As illustrated in FIG. 9, a side surface of the body 71 includes a plurality of pin insertion holes 71H provided in the front-rear direction (i.e., X-axis direction). In this preferred embodiment, three pin insertion holes 71H are provided in the body 71, but the number of pin insertion holes 71H is not specifically limited. The pin insertion holes 71H are provided at regular intervals. The pin insertion holes 71H extend in the Y-axis direction. The rods 8B of the fixing pins 8 (see FIG. 4) are inserted in the pin insertion holes 71H. That is, the fixing pins 8 are inserted in the pin insertion holes 71H to extend in the Y-axis direction. In this preferred embodiment, portions of the rods 8B inserted in the pin insertion holes 71H penetrate the body 71 to be exposed to the outside (see FIG. 7). The upper surface of the body 71 includes a plurality of screw insertion holes 71S provided in the front-rear direction. The screw insertion holes 71S respectively communicate with the pin insertion holes 71H. The screw insertion holes 71S are provided at regular intervals. Fixing screws 88 (see FIG. 7) are inserted in the screw insertion holes 71S. The fixing screws 88 are locked with the rods 8B of the fixing pins 8. The screw insertion holes 71S extend in the Z-axis direction. In this preferred embodiment, the pin insertion holes 71H of the second holder 70 are located at positions facing the pin insertion holes 61H of the first holder 60 while the second holder 70 is attached to the first holder 60. The state where the pin insertion holes 71H face the pin insertion holes 61H includes a case where the pin insertion holes 71H completely coincide with the pin insertion holes 61H with respect to the X-axis direction (i.e., a case where the pin insertion holes 61H are located immediately at the front of the pin insertion holes 71H) and a case where some of the pin insertion holes 71H coincide with some of the pin insertion holes 61H. The shape of each pin insertion hole 71H is the same or substantially the same as the shape of each pin insertion hole 61H. The shape of each screw insertion hole 71S is the same or substantially the same as the shape of each screw insertion hole 61S. The pin insertion holes 71H are an example of a second fixing portion.

Figure 10:
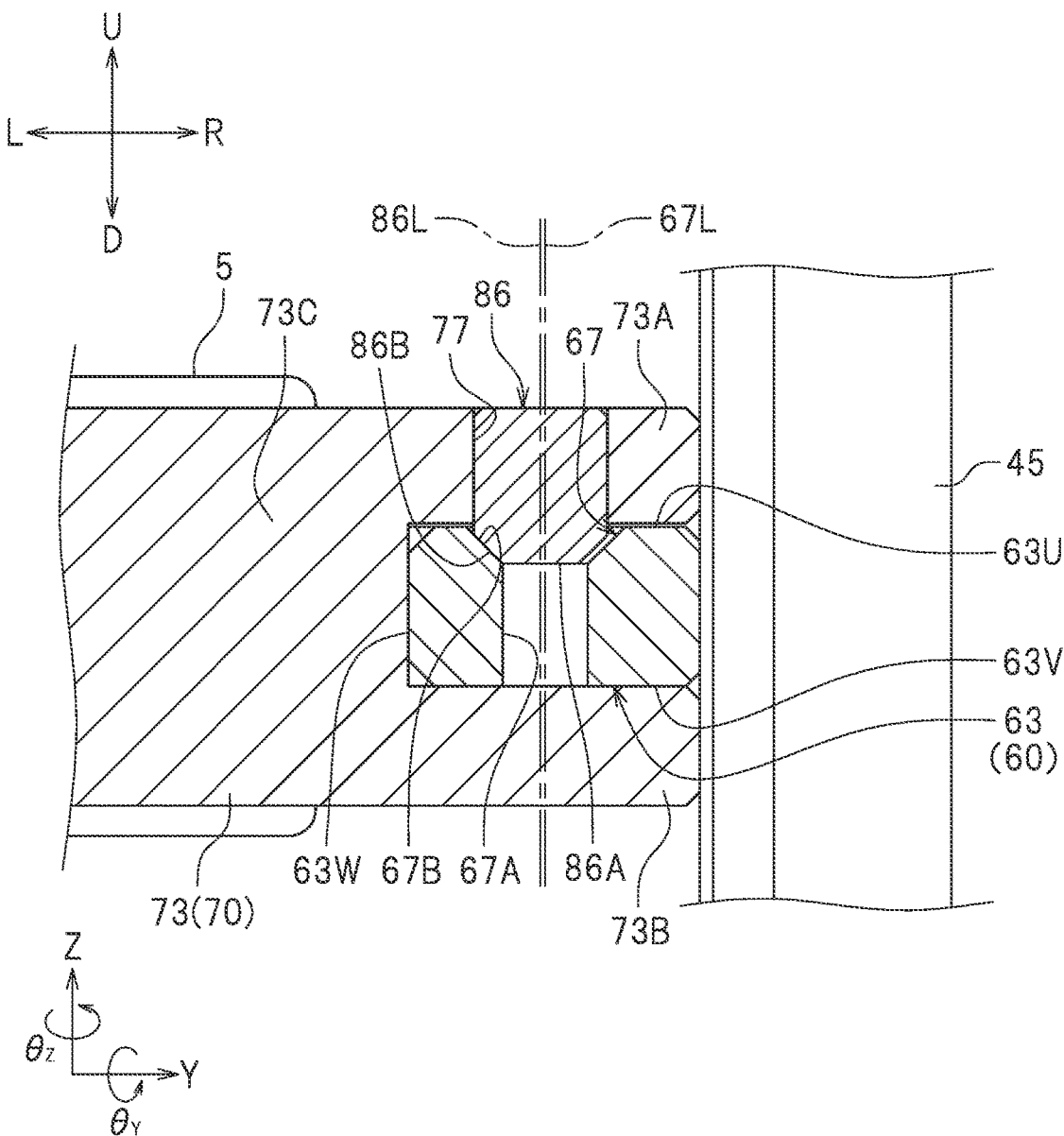
FIG. 10 is a cross-sectional view taken along line A-A in FIG. 7.

As illustrated in FIG. 8, the front coupling portion 73 and the rear coupling portion 75 have screw holes 77 in which the fastening screws 86 (see FIG. 7) are inserted. Each of the screw holes 77 extends in the Z-axis direction. The screw holes 77 are provided in first portions 73A and 75A described later. As illustrated in FIG. 10, the front coupling portion 73 includes the first portion 73A, a second portion 73B, and a third portion 73C. In a state where the second holder 70 is attached to the first holder 60, the first portion 73A faces an upper surface 63U of the front coupled portion 63, the second portion 73B is located at a position facing the first portion 73A, and the third portion 73C couples the first portion 73A and the second portion 73B. The second portion 73B is in contact with a lower surface 63V of the front coupled portion 63. Third portion 73C is in contact with a side surface 63W of the front coupled portion 63. As illustrated in FIG. 8, the rear coupling portion 75 includes the first portion a second portion 75B, and a third portion 75C. In the state where the second holder 70 is attached to the first holder 60, the first portion 75A faces an upper surface 65U of the rear coupled portion 65, the second portion 75B is located at a position facing the first portion 75A, and the third portion 75C couples the first portion 75A and the second portion 75B. The second portion 75B is in contact with a lower surface 65V of the rear coupled portion Third portion 75C is in contact with a side surface 65W of the rear coupled portion 65.

As illustrated in FIG. 10, a front end portion (lower end portion in this case) of each fastening screw 86 in a direction along an axis 86L has a slope 86B that tilts inward toward the front end, and a bottom surface 86A connected to the front end of the slope 86B. The slope 86B is in contact with the slope 67B of the locking recesses 67. The bottom surface 86A faces the through hole 67A of the locking recesses 67. The bottom surface 86A is an example of a flat plane. The slope 86B is an example of a first slope.

To attach processing targets 5 to the holder 50, the second holder 70 is first detached from the first holder 60. Then, the processing targets 5 are attached to each of the first holder and the second holder 70. Thereafter, the second holder 70 provided with the processing targets 5 is attached to the first holder 60 provided with the processing target 5. In this preferred embodiment, with respect to the Y-axis direction, a distance TL between the processing targets 5 fixed to the pin insertion holes 61H of the first holder 60 and processing targets 5 fixed to the pin insertion holes 71H of the second holder 70 is shorter than a length PL of the fixing pins 8, as illustrated in FIG. 7. The distance TL is shorter than a length SL of the rods 8B of the fixing pins 8, for example. The distance TL is longer than a diameter DM of each processing tool 6 (see FIG. 6), for example. The distance TL may be shorter than the diameter DM.

In this preferred embodiment, in a state where the second holder 70 is moved in the Y-axis direction and the screw holes 77 of the second holder 70 overlap with the locking recesses 67 of the first holder 60, the axes 86L of the fastening screws 86 inserted in the screw holes 77 are shifted from center axes 67L of the locking recesses 67 with respect to the Y-axis direction. By gradually fastening the fastening screws 86, the slopes 86B of the fastening screws 86 are brought into contact with the slopes 67B of the locking recesses 67. Then, when the fastening screws 86 are further fastened, the second holder 70 is drawn toward the adaptor 45 and the side surface 63W of the front coupled portion 63 is brought into contact with the third portion 73C of the front coupling portion 73, and the side surface 65W of the rear coupled portion 65 is brought into contact with the third position 75C of the rear coupling portion 75. At this time, the lower surface 63V of the front coupled portion 63 is in contact with the second portion 73B of the front coupling portion 73, and the lower surface 65V of the rear coupled portion 65 is in contact with the second portion 75B of the rear coupling portion 75. That is, the first holder 60 and the second holder 70 are fixed together at three locations: the slopes 86B and the slopes 67B, the side surface 63W and the third portion 73C (the side surface 65W and the third portion 75C), and the lower surface 63V and the second portion 73B (the lower surface 65V and the second portion 75B). Accordingly, the positional relationship between the first holder 60 and the second holder 70 is constant or substantially constant. In addition, since the directions of fastening forces are different at each of the three locations, the total fastening force between the first holder 60 and the second holder 70 is further enhanced. While the second holder 70 is attached to the first holder 60, the axes 86L of the fastening screws 86 are shifted from the center axes 67L of the locking recesses 67 with respect to the Y-axis direction. In this preferred embodiment, the axes 86L are located at the left of the center axes 67L. That is, with respect to the Y-axis direction, the axis 86L, the center axis 67L, and the adaptor 45 are provided in this order from the left to the right.

The controller 100 is, for example, a computer. The controller 100 may include a central processing unit (CPU) that executes an instruction of a control program, a read only memory (ROM) that stores, for example, programs to be executed by the CPU, a random access memory (RAM) that is a working area to develop programs, and a storage medium such as a memory to store various types of data and the like. The controller 100 may perform control concerning a cutting process by using a program stored in the ROM, for example. The controller 100 is located behind the case body 12 in this preferred embodiment. A portion or whole of the controller 100 may be provided outside the case body 12.

As described above, in the cutting machine 10 according to this preferred embodiment, since the second holder 70 is detachably attached to the first holder 60, fixing of processing targets 5 to the pin insertion holes 61H of the first holder 60 and fixing of processing targets 5 to the pin insertion holes 71H of the second holder 70 are able to be performed independently of each other. That is, in fixing processing targets 5 to the pin insertion holes 61H, it is unnecessary to consider interference with processing targets 5 fixed to the pin insertion holes 71H. Similarly, in fixing the processing targets 5 to the pin insertion holes 71H, it is unnecessary to consider interference with the processing targets 5 fixed to the pin insertion holes 61H. Thereafter, the second holder 70 to which the processing targets 5 are fixed only needs to be attached to the first holder 60 to which the processing targets 5 are fixed. Thus, the distance Tl between the processing targets 5 fixed to the pin insertion holes 61H and the processing targets 5 fixed to the pin insertion holes 71H with respect to the Y-axis direction is able to be shorter than the length PL of each fixing pin 8. That is, since an extra space to attach processing targets 5 is unnecessary, an increase in size of the entire holder 50 is able to be reduced or prevented.

In the cutting machine 10 of this preferred embodiment, the second holder 70 is attached to the first holder 60 to be detachable in the Y-axis direction. Although the spindle 30 is located above the holder 50, since the second holder 70 is attached to the first holder 60 to be detachable in the Y-axis direction, interference between the spindle 30 and the second holder 70 is able to be reduced or prevented when the second holder 70 is attached or detached.

In the cutting machine 10 of this preferred embodiment, the second holder 70 includes the front coupling portion 73 having the screw holes 77 in which the fastening screws 86 are inserted, and the first holder 60 includes the front coupled portion 63 having the locking recesses 67 to which the fastening screws 86 are locked. As described above, by locking the fastening screws 86 in the locking recesses 67, the second holder 70 is able to be securely fixed to the first holder 60.

In the cutting machine 10 of this preferred embodiment, the front end portion of each fastening screw 86 in the direction along in the axis 86L includes the slope 86B that tilts inward toward the front end and the bottom surface 86A connected to the front end of the slope 86B, and each of the locking recesses 67 has the slope 67B that is in contact with the slope 86B of the fastening screw 86 and tilts outward toward the top. While the second holder 70 is attached to the first holder 60, the axes 86L of the fastening screws 86 are shifted from the center axes 67L of the locking recesses 67 with respect to the Y-axis direction. Accordingly, in fastening the fastening screws 86, the axes 86L of the fastening screws 86 and the center axes 67L of the locking recesses 67 approach each other in the Y-axis direction and the first holder 60 and the second holder 70 are fixed to each other at predetermined locations.

In the cutting machine 10 of this preferred embodiment, while the second holder 70 is attached to the first holder 60, the axis 86L of the fastening screw 86, the center axis 67L of the locking recess 67, and the adaptor 45 are provided in this order with respect to the Y-axis direction. Accordingly, in fastening the fastening screws 86, the second holder 70 is drawn toward the first holder 60 and the third portion 73C of the front coupled portion 73 and the side surface 63W of the front coupled portion 63 are more securely brought into contact with each other. Thus, the second holder 70 is able to be more accurately attached to the first holder 60. That is, the accuracy in positioning the second holder 70 to the first holder 60 is able to be improved.

In the cutting machine 10 of this preferred embodiment, the distance TL is longer than the diameter DM of each processing tool 6. Accordingly, while an increase in size of the holder 50 is reduced or prevented, a cutting process is able to be performed on processing targets 5 by using the side surfaces of the processing tools 6.

In the cutting machine 10 of this preferred embodiment, the front end 50F of the holder 50 is located behind the front end 40F of the tool magazine 40, and the rear end 50R of the holder 50 is located ahead of the rear end 40R of the tool magazine 40. Accordingly, an increase in size of the processing space 19 is able to be reduced or prevented. That is, an increase in size of the entire cutting machine 10 is able to be reduced or prevented.

One preferred embodiment of the present invention has been described above. The preferred embodiment described above, however, is merely an example, and the present invention includes other preferred embodiments.

In the preferred embodiment described above, the first holder 60 includes the locking recesses 67, and the second holder 70 includes the screw holes 77. The present invention, however, is not limited to this example. For example, the first holder 60 may have screw holes 77 with the second holder 70 having locking recesses 67.

In the preferred embodiment described above, the first holder 60 includes the locking recesses 67. Alternatively, the locking recesses 67 may be replaced by screw holes in which the fastening screws 86 are inserted.

In the preferred embodiment described above, the second holder 70 is attached or detached to/from the first holder 60 by sliding the second holder 70 in the Y-axis direction. The second holder 70 may be attached and detached to/from the first holder 60 by sliding the second holder 70 in the Z-axis direction.

Figure 11:
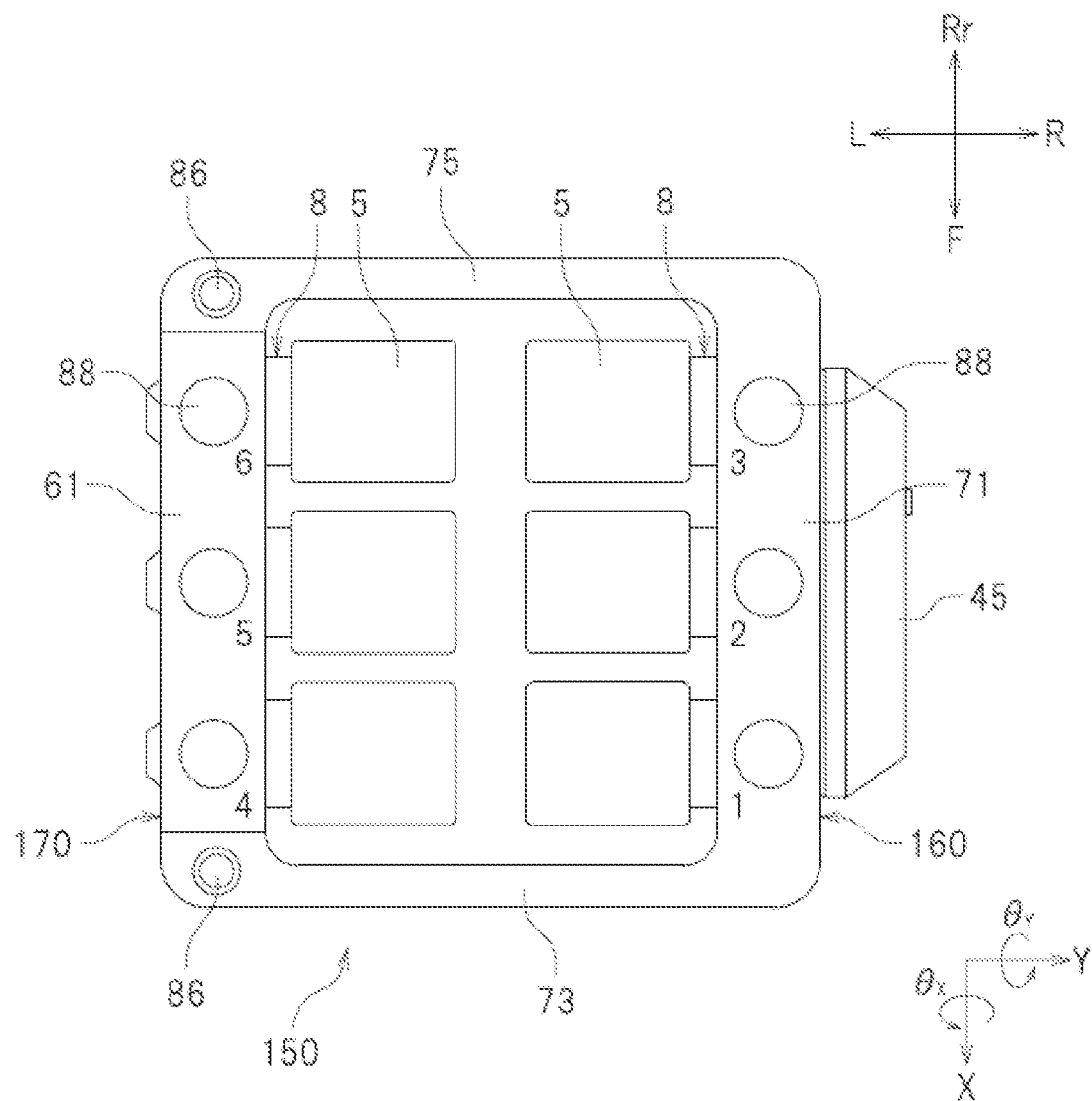
FIG. 11 is a plan view of a holder according to another preferred embodiment of the present invention.

In the preferred embodiment described above, the holder 50 includes the first holder 60 including the body 61, the front coupled portion 63, and the rear coupled portion 65; and the second holder 70 including the body 71, the front coupling portion 73, and the rear coupling portion 75. The present invention, however, is not limited to this example. For example, as illustrated in FIG. 11, the holder 150 may include a first holder 160 including a body 71, a front coupling portion 73, and a rear coupling portion 75 and a second holder 170 including a body 61, a front coupled portion 63, and a rear coupled portion 65. At this time, the body 71 of the first holder 160 is fixed to the adaptor 45.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principles of the present invention. These preferred embodiments are provided with the understanding that they are not intended to limit the present invention to the preferred embodiments described in the specification and/or shown in the drawings. The present invention is not limited to the preferred embodiment described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A cutting machine comprising:
   a spindle extending in a first direction to hold a processing tool to cut a plurality of processing targets;
   a holder located below the spindle to hold the plurality of the processing targets;
   a plurality of fixing pins that are each attached to a respective one of the plurality of processing targets;
   a rotation shaft extending in a second direction intersecting the first direction and rotating about the second direction; and
   a rotation support connected to the rotation shaft to rotatably support the holder; wherein
   the holder includes:
   a first holder including a plurality of first fixing portions and fixed to the rotation support, a first portion of the plurality of the fixing pins being fixed to the plurality of the first fixing portions; and
   a second holder including a plurality of second fixing portions and being detachably attached to the first holder, the plurality of the second fixing portions being directly across from the plurality of the first fixing portions with respect to the second direction, and a second portion of the plurality of the fixing pins being fixed to the plurality of the second fixing portions;
   the first holder includes a body extending in a third direction intersecting the first direction and the second direction, the first holder having a straight shape in plan view,
   the plurality of the first fixing portions and the plurality of the second fixing portions are provided in the third direction,
   the plurality of the fixing pins is fixed to the plurality of the first fixing portions and the plurality of the second fixing portions to extend in the second direction;
   a distance in the second direction between a first portion of the plurality of the processing targets that are attached to the first portion of the plurality of the fixing pins and a second portion of the plurality of the processing targets that are attached to the second portion of the plurality of fixing pins is shorter than a length of the plurality of the fixing pins;
   the second holder is detachably attached to the first holder with respect to the first direction;
   one of the first holder and the second holder includes a first coupling portion including a screw hole in which a fastening screw is inserted;
   another one of the first holder and the second holder includes a second coupling portion including a locking recess in which the fastening screw is locked;

a front end portion of the fastening screw in a direction along a longitudinal axis of the fastening screw has a first sloped surface that tilts inward from an outer circumference of the fastening screw toward an end surface of the fastening screw, and the end surface of the fastening screw includes a flat surface connected to a front end of the first sloped surface;

the locking recess includes a through hole, the through hole having a second sloped surface that is in contact with the first sloped surface of the fastening screw, the second sloped surface of the through hole tilting outward from an upper end of the through hole toward an upper end of the locking recess; and in response to the second holder being attached to the first holder, the longitudinal axis of the fastening screw shifts from a center axis of the locking recess with respect to the second direction.

2. The cutting machine according to claim 1, wherein the first coupling portion includes:

a first portion having the screw hole, the first portion including a surface that is directly across from an upper surface of the second coupling portion, a second portion including a surface that is directly across from the first portion and is in contact with a lower surface of the second coupling portion, and a third portion coupling the first portion and the second portion to each other and in contact with a side surface of the second coupling portion; and in response to the second holder being attached to the first holder, the longitudinal axis of the fastening screw, the center axis of the locking recess, and the rotation support are provided in this order with respect to the second direction.

3. The cutting machine according to claim 1, wherein the distance is longer than a diameter of the processing tool.

4. The cutting machine according to claim 1, further comprising:

a tool magazine to accommodate the processing tool; wherein a front end of the holder is located behind a front end of the tool magazine; and a rear end of the holder is located ahead of a rear end of the tool magazine.

5. The cutting machine according to claim 1, wherein the second holder is U-shaped in plan view.

6. The cutting machine according to claim 1, wherein the first portion of the plurality of the fixing pins fixed to the plurality of the first fixing portions protrudes outside the first holder, and the second portion of the plurality of the fixing pins fixed to the plurality of the second fixing portions protrudes outside the second holder.

* * * * *